(12) United States Patent
Huntley (10) Patent No.: US 6,308,902 B1
(45) Date of Patent: Oct. 30, 2001

(54) DRIP IRRIGATION HOSE WITH EMITTERS HAVING DIFFERENT DISCHARGE RATES

(75) Inventor: Mark Huntley, La Jolla, CA (US)

(73) Assignee: T-Systems International, Inc., San Diego, CA (US)

( * ) Notice: Subject to any disclaimer, the term of this patent is extended or adjusted under 35 U.S.C. 154(b) by 0 days.

(21) Appl. No.: 09/443,561

(22) Filed: Nov. 19, 1999

Related U.S. Application Data (60) Provisional application No. 60/109,667, filed on Nov. 20, 1998.

(51) Int. Cl.⁷ .............................. B05B 15/00; B05B 17/00
(52) U.S. Cl. ................................... 239/542; 239/1
(58) Field of Search ......................... 239/542, 1; 138/105

(56) References Cited

U.S. PATENT DOCUMENTS

| | | | | |
|---|---|---|---|---|
| 4,247,051 | * | 1/1981 | Allport | 239/542 |
| 4,430,020 | * | 2/1984 | Robbins | 239/542 |
| 4,534,515 | | 8/1985 | Chapin | 239/542 |
| 4,756,339 | | 7/1988 | Buluschek | 138/115 |
| 4,984,739 | * | 1/1991 | Allport | 239/542 |
| 5,163,622 | * | 11/1992 | Cohen | 239/542 |
| 5,246,164 | * | 9/1993 | McCann et al. | 239/73 |
| 5,458,712 | | 10/1995 | DeFrank | 156/203 |
| 5,636,797 | * | 6/1997 | Cohen | 239/542 |
| 5,855,324 | * | 1/1999 | DeFrank et al. | 239/542 |

* cited by examiner

*Primary Examiner*—Kevin Shaver
*Assistant Examiner*—Davis Hwu
(74) *Attorney, Agent, or Firm*—Christie, Parker & Hale, LLP

(57) ABSTRACT

An improved drip irrigation hose is provided. The hose has a water supply passage and a plurality of flow regulating channels manufactured into the hose that are smaller than the water supply passage. The flow regulating channels each comprise a predesignated geometry to provide a desired discharge rate at a given pressure, an inlet section comprising one or more openings connecting the water supply passage to that flow regulating channel, and an outlet section comprising one or more openings connecting that flow regulating channel to the exterior of the hose. The plurality of flow regulating channels have at least two different geometries to provide at least two different discharge rates at the given pressure field. This invention has value to the irrigation designer in that it allows the designer to select emitter characteristics depending on the position of the emitter in the field.

41 Claims, 3 Drawing Sheets

DRIP IRRIGATION HOSE WITH EMITTERS HAVING DIFFERENT DISCHARGE RATES

CROSS-REFERENCE TO RELATED APPLICATION

This application claims priority of U.S. Provisional Patent Application No. 60/109,667, filed Nov. 20, 1998, the entire disclosure of which is incorporated herein by reference.

BACKGROUND OF THE INVENTION

Drip irrigation systems have come into widespread use in the agricultural area. Drip irrigation systems supply water at a slow, controlled rate to the root zone of the particular plants being irrigated. Typically, drip irrigation is accomplished by providing a low volume water outlet at each plant that permits a limited dripping of water directly to the root zone of the particular plant. Because evaporation, runoff, overwatering, and watering beyond the root zone are eliminated, substantial water and nutrient savings are realized. In addition, drip irrigation reduces contaminants to the water table by enabling the farmer to supply only enough water and fertilizer to reach the plants, reducing excess water that would run off and contaminate the water table below.

Drip irrigation hoses tend to be relatively long to be able to extend across a field. As the water travels along the hose away from the water source, the pressure of the water decreases. Thus, the water pressure at the beginning of the hose (near the water source) is greater than that at the far end of the hose. Because the drip rate of the hose is a function of the water pressure, the drip rate at the beginning of the hose tends to be greater than at the end of the hose. Other field conditions, such as elevation, also affect the pressure, and thus the drip rate, along the length of the hose. However, it is often desirable to have a relatively uniform drip rate along the length of the hose. Moreover, other varying field conditions, such as soil type and drainage, create a need to have different drip rates throughout the field to compensate for the different field conditions.

One proposed solution to the pressure variation problems is to incorporate pressure-compensating emitters into the hoses to reduce the effect of the pressure difference over the length of the hose on the drip rate along the length of the hose. Such hoses are described in U.S. patent application No. 09/308,060, entitled "Pressure-Compensating Drip Irrigation Hose and Method for Its Manufacture". However, although these designs address certain pressure-compensation issues, they do not provide a way to provide predetermined drip rates that vary along the hose.

SUMMARY OF THE INVENTION

The present invention is directed to drip irrigation hosing having a series of emitters that differ in geometry to provide different predetermined discharge rates throughout a field. This invention has value to the irrigation designer in that it allows the designer to select emitter characteristics depending on the position of the emitter in the field. For instance, the position of the emitter in the field may subject it to a different supply pressure than if it were at a different location in the field. The supply pressure at different locations will vary as ground elevation changes or as the distance between the main water supply and the emitter increases. Changes in supply pressure affect discharge rate and uniformity of water distribution if all emitters are identical. Therefore it is desirable to vary the emitter discharge to compensate for changes in topography. Additionally it is desirable to vary the discharge rate of the emitters as soil type and drainage change with field position. The invention can be used for all types of drip irrigation hosing, including collapsible tubing, regardless of method of manufacturing, seamless, folded or otherwise, and hard hose.

In one embodiment, the invention is directed to a drip irrigation hose having a water supply passage and a plurality of flow regulating channels manufactured into the hose that are smaller than the water supply passage. The flow regulating channels each comprise a predesignated geometry to provide a desired discharge rate at a given pressure, an inlet section comprising one or more openings connecting the water supply passage to that flow regulating channel, and an outlet section comprising one or more openings connecting that flow regulating channel to the exterior of the hose. The plurality of flow regulating channels have at least two different geometries to provide at least two different discharge rates at the given pressure.

In another embodiment, the invention is directed to a method for providing generally uniform irrigation in a field. A hose is manufactured having first and second ends, a water supply passage and a plurality of flow regulating channels as described above. The flow regulating channels nearer the first end of the hose have geometries different from the geometries of the flow regulating channels nearer the second end of the hose so that, at a given pressure, the flow regulating channels nearer the second end have a greater discharge rate than the flow regulating channels nearer the first end of the hose. The hose is placed in the field with the first end of the hose connected to a water supply source. Water is introduced through the hose, whereby the discharge rates of the flow regulating channels are generally uniform over the length of the hose. This method eliminates difference is discharge rates due to pressure differences at the different flow regulating channels due to distance from the water supply source.

In another embodiment the invention is directed to a method for providing generally uniform irrigation in a field having different elevations. This method eliminates differences in discharge rates due to pressure differences at the different flow regulating channels due to elevation differences of the flow regulating channels. In accordance with the method, the topography of the field is mapped. A hose is manufactured having first and second ends, a water supply passage and a plurality of flow regulating channels, as described above. The plurality of flow regulating channels have at least two different geometries to provide at least two different discharge rates at the given pressure. The hose is placed in the field so that the flow regulating channels that produce higher discharge rates are positioned at higher elevations than the flow regulating channels that produce lower discharge rates. Water is introduced through the hose. The discharge rates of the flow regulating channels are generally uniform over the length of the hose.

In another embodiment the invention is directed to a method for irrigating a field having different soil conditions, such as different soil types or drainage differences. The method comprises manufacturing a hose having first and second ends, a water supply passage and a plurality of flow regulating channels, as described above. The plurality of flow regulating channels have at least two different geometries to provide at least two different discharge rates at the given pressure. The hose is placed in the field so that the flow regulating channels having higher discharge rates are positioned near soil conditions where a higher discharge rate is desired, and flow regulating channels having lower discharge rates are positioned near soil conditions where a lower discharge rate is desired. Water is introduced through the hose.

In another embodiment, the invention is directed to an improved method for manufacturing a drip irrigation hose having a water supply passage and a plurality of flow regulating channels having a cross-sectional area smaller than that of the water supply passage. The improvement comprises varying the geometries of the flow regulating channels so that the plurality of flow regulating channels have at least two different geometries to provide at least two different discharge rates at a given pressure.

DESCRIPTION OF THE DRAWINGS

These and other features and advantages of the present invention will be better understood by reference to the following detailed description when considered in conjunction with the accompanying drawings wherein.

DETAILED DESCRIPTION

The present invention is directed to drip irrigation hosing having a series of emitters that differ in geometry to provide different discharge rates throughout a field. In a particularly preferred embodiment, the invention is directed to a continuous tape with each emitter discharge rate adjusted to conform to specific irrigation needs at a particular location in a field layout.

Figure 1:
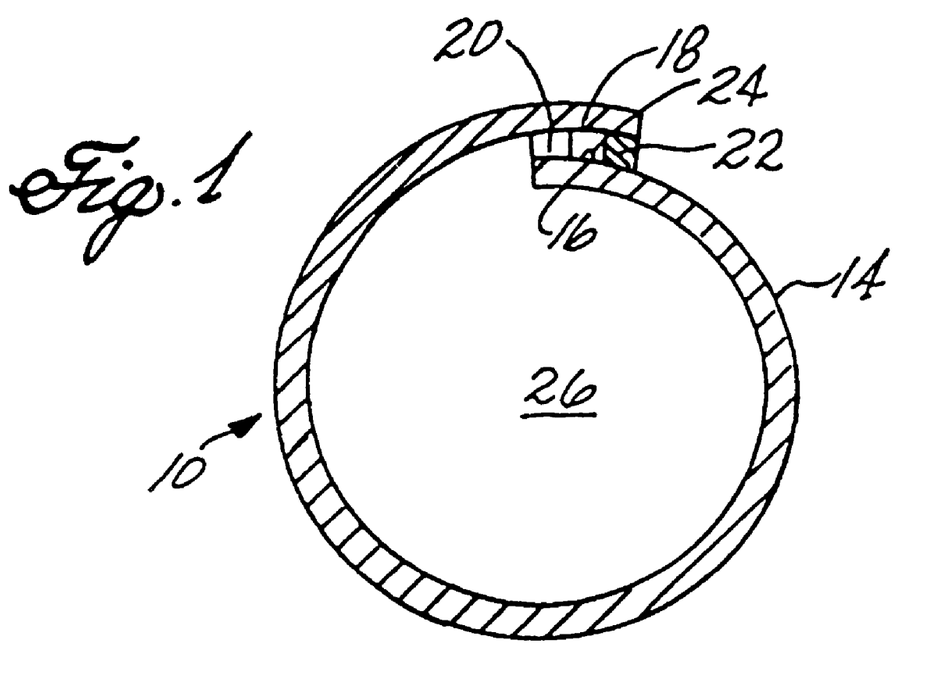
FIG. 1 is a cross-sectional view of a drip irrigation hose having a flow regulating channel between its margins.

As shown in FIG. 1, a flexible drip irrigation hose 10 (commonly referred to as "tape") is made from an elongated strip of plastic film 14, which is typically 4 to 15 mil thick. The film 14 can be made of any suitable material, for example, a laminate of high density polyethylene or polypropylene. Film 14 is folded longitudinally to form overlapping inner and outer longitudinal margins 16 and 18, thus creating a seam. A first longitudinal rib 20 partially seals margins 16 and 18. A second longitudinal rib 22, outboard of rib 20, completely seals margins 16 and 18. Ribs 20 and 22 contain a repeating longitudinal pattern that defines a series of small flow regulating channels 24 along the length of the hose 10. By virtue of the longitudinal fold in film 14, the interior surface of film 14 defines a relatively large water supply passage 26. The water supply passage 26 is connected to a source of water under pressure, not shown. Examples of such constructions are described in U.S. Pat. Nos. 4,247,051, 4,984,739, 5,282,578, and 5,522,551, the disclosures of which are incorporated herein by reference.

Figure 2:
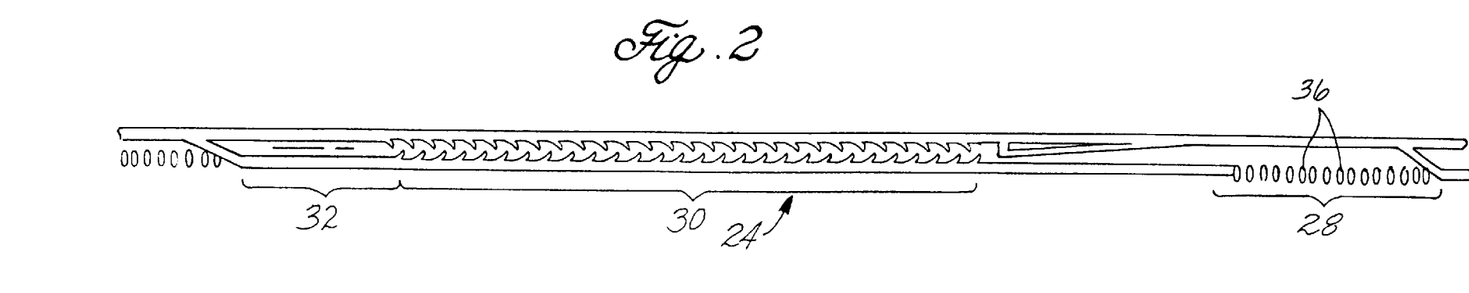
FIG. 2 is a top sectional view of a flow regulating channel according to the invention.

As shown in FIG. 2, the flow regulating channels 24 (i.e., emitter regions) each have an inlet section 28, a turbulent flow section 30, and an outlet section 32. For each flow regulating channel 24, the inlet section 28 comprises one or more inlet openings to allow water to flow from the water supply passage 26 into the flow regulating channel 24. In the depicted embodiment, the inlet section 28 comprises a plurality of pillars 36 between which are formed openings 38. As would be recognized by one skilled in the art, the inlet section 28 can have any other design that permits water to enter the flow regulating channel 24 from the water supply passage 26.

The flow regulating channels 24 each have a much smaller cross-sectional area than the water supply passage 26. The cross-sectional area of the water supply passage 26 is preferably from about 20 to 300 times, more preferably from about 50 to 200 times, larger than the cross-sectional area of the flow regulating channel 24. Accordingly, each flow regulating channel 24 creates a passage between the water supply passage 26 and the outside of the hose 10 that controls the flow rate of the water flowing through it.

The flow regulating channels 24 can have any other design as is known in the art. For example, the turbulent flow section 30 can be formed of a series of chevrons, by a series of walls that form a serpentine path, or by any other configuration that creates turbulent flow. However, the turbulent flow section can be omitted if desired and replaced with a straight-path channel.

Figures 3, 4:
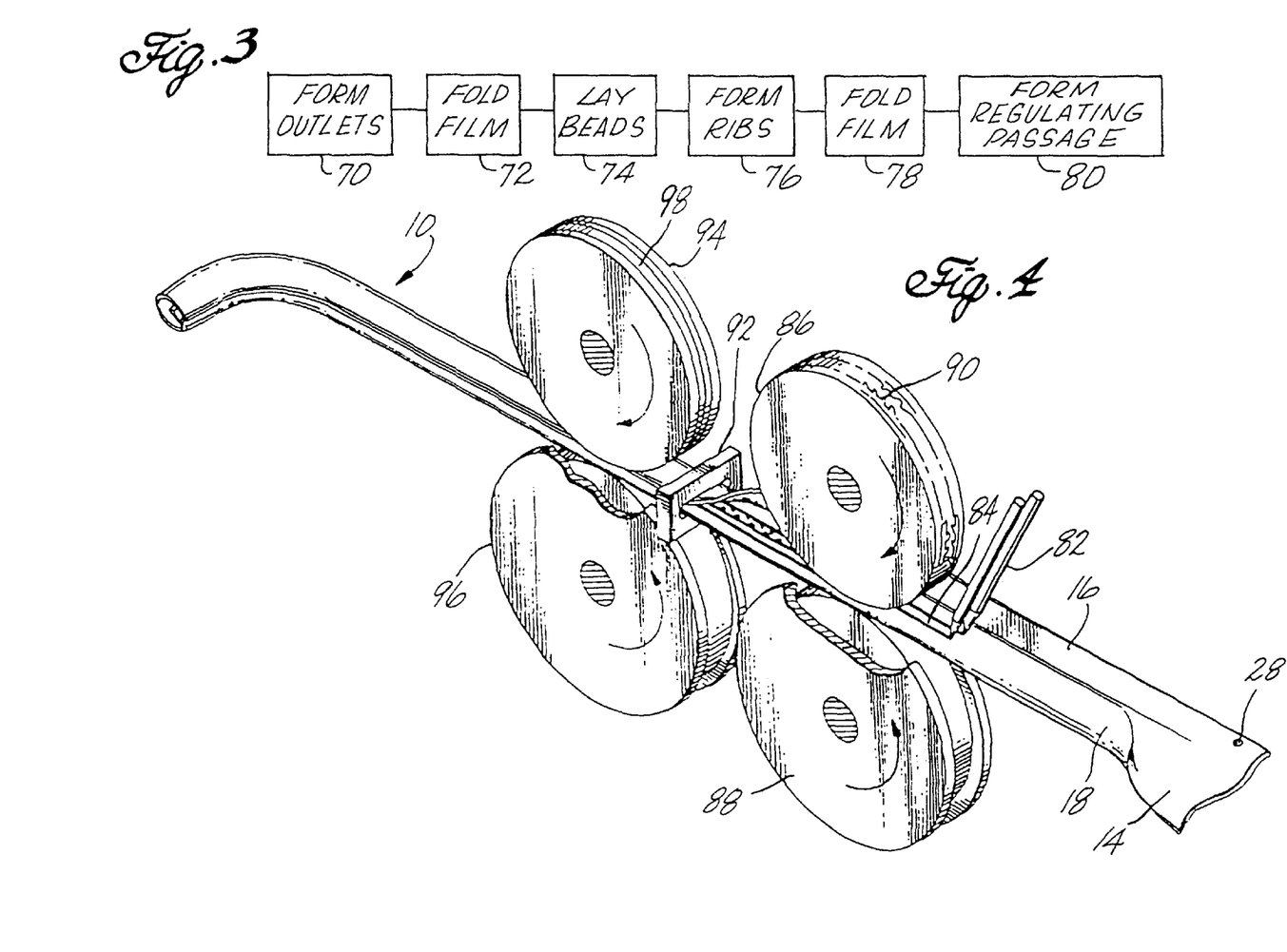
FIG. 3 is a schematic block diagram of the method for making a drip irrigation hose of the continuous emitter type.
FIG. 4 is a schematic view of a portion of the film path for making a drip irrigation hose in accordance with the invention.

FIGS. 3 and 4 depict a method for making the drip irrigation hose shown in FIG. 1. As represented by a block 70, the outlets 44 are first formed in film 14. Preferably each outlet 44 comprises a single longitudinal slit in the film 14. A preferred method and apparatus for forming such a knife-formed slit outlet is described in U.S. Pat. No. 5,522,551, the disclosure of which is incorporated herein by reference. Any other suitable method known in the art for providing outlets can also be used.

As represented by block 72, the inner margin 16 is then folded. As represented by block 74, one or more beads are laid on the outside surface of the inner margin 14 by one or more extrusion nozzles. As represented by block 76, a pattern is formed in ribs 20 and 22 by a molding wheel. As represented by block 78, outer margin 18 is then folded onto inner margin 16, with the formed ribs therebetween. Finally, as represented by block 80, flow regulating passage 24 is finished by passing inner margin 16, outer margin 18, and the ribs 20 and 22 through the nip of a form wheel and a backing wheel to set precisely the height of the ribs.

FIG. 4 illustrates an assembly station for performing the above-described steps. One or more extrusion nozzles 82 deposit one or more continuous longitudinal beads 84 (in the form of hot molten glue or resin) on the outside surface of the inner margin 16. The film 14 is passed through the nip of a rotating molding wheel 86 and a rotating backing wheel 88. The molding wheel 86 contains a pattern of depressions 90 corresponding to the desired raised rib pattern, i.e., a pattern such as that shown in FIG. 2. In the nip, beads 84 are shaped by molding wheel 86 to form the desired bead pattern on film 14 for the entire length of the hose 10. After leaving the nip of wheels 86 and 88, the external margin 18 of the film 14 is folded by a guide 92 to overlap the inner margin 16. Finally, the overlapped margins of the film 14 pass through the nip of a form wheel 94 and a second backing wheel 96. The form wheel 94 has a groove 98 that depresses the ribs formed by the beads 84 to set the rib height at a specified value that determines the flow rate of the hose 10. During the described process, the film 14 is continuously transported by a conventional means, not shown. For example, the disclosed wheels could be driven, or other drive wheels could be provided, to transport the film.

In a preferred embodiment, as the hose is being made, the height of each flow regulating channel 24 is adjusted on an individual basis using a track controller. The track controller is a device that shapes the final height of the bead pattern by passing it between two rollers. The space between the rollers is adjusted by controlling the position of one of the rollers with an electronically-controlled linear actuator. The input signal to the actuator is provided by a computer and is programmed to correspond with a signal from a footage counter locating the position on the hose. It is important to control the amount of glue extruded to form the beads to ensure that glue starvation is not an issue. The extruder output is tied in to the track controller.

As would be recognized by one skilled in the art, other aspects of the flow regulating channel 24 geometry can be changed in addition to or instead of the height, such as the width of the flow regulating channel, the size of the inlets openings, the size of the outlets 44, the number and/or arrangement of the chevrons in the turbulent flow section 30 or the length of the turbulent flow section. For example, as the length of the turbulent flow section is increased, the pressure drop across the turbulent flow section will increase. For convenience, the flow regulating channels 24 can be numbered (or otherwise indicated or coded) and the corresponding track height (or other geometry variation), and therefore discharge rate, can be identified with a particular position on the hose 10.

The information for adjusting the geometry of the flow regulating channels 24 can be provided in any suitable manner. In one embodiment, GPS (global position satellite) mapping techniques are used to map the topography of the field in which the hose is to be placed. The GPS map can be sent electronically to the computer and can be used to send information to the track controller. Additionally, the GPS map configuration can be fed into the assembly mach computer to and automatically mark information, such as "roll # of a total # of rolls", on the hose so that the farmer can distinguish between the rolls for proper placement in the field. The track controller change being linked to the footage provides the information required by the assembly machine computer to make the labels according to the product and product section made. Other surveying techniques could be similarly used to provide a map of the field.

Also, as would be recognized by one skilled in the art, the flow regulating channels 24 need not be formed in the margins 16 and 18 of the hose 10, but can be provided at any location on the hose. For example, it is known in the art to provide discrete flexible emitters (not shown) that are adhered or otherwise bonded to the interior or exterior of the hose, with each emitter having a flow regulating channel 24 as described above. For example, flexible discrete external emitters can be adhered to the exterior of the hose, as described in U.S. patent application No. 09/136,354, entitled "External Emitter for Drip Irrigation Hose", the disclosure of which is incorporated by reference. Alternatively, emitters can be penetrably mounted within the wall of the hose, as described in U.S. Pat. Nos. 4,850,531, 4,077,570 and 3,970,251, the disclosures of which are incorporated herein by reference. In accordance with the invention, a number of discrete emitters (i.e., flow regulating channels) having different geometries are preferably manufactured into the hose to provide a complete product to the farmer. In other words, the hose is designed and manufactured to conform to a farmer's particular field conditions so that the farmer can simply lay the hose without having to insert or replace the emitters to achieve the desired drip rates. The emitters having different geometries can be made by any method known to those skilled in the art, such as injection, insert, or sequential molding. The hose (or tape) can also be manufactured by any method known in the art, such as by providing a film with overlapping margins, as described above, or by extrusion. The emitters can then be attached to the inside or outside of the hose by any of several methods including, but not limited to, adhesive bonding, solvent bonding, thermal bonding, ultrasonic welding and penetration. The emitters are attached to the hose so that an emitter having a given geometry (and therefore a given drip rate at a certain pressure) is provided in a location on the hose that will ultimately be placed in a location in a field having characteristics that correspond to the given drip rate.

Alternatively, a continuous emitter can be bonded to the hose, where the continuous emitter has a series of flow regulating channels 24 along its length. In this embodiment, the continuous emitter can be pre-formed having flow regulating channels 24 having varying geometries, e.g., varying height, width, inlet size or outlet size, as desired for a particular field. The pre-formed continuous emitter can then be manufactured into the irrigation hose by bonding it to the hose in any suitable manner known in the art. For example, the emitter can be extruded and formed by means of an embossing or imprinting tool. This technique is particularly useful if the hose is also being extruded. Thus, a continuous emitter could be extruded and formed, then inserted into a die center around which a hose is extruded. As the emitter and hose are extruded together, the emitter would be formed and adhered to the hose before it is cooled. Alternatively, the continuous emitter could be extruded and formed offline, and then fed through a hole in the die through which a hose is extruded. In another embodiment, the continuous emitter could be fed and joined to a long continuous strip that is then folded to form a hose.

In another embodiment, the drip irrigation hose is a hard hose having a plurality of discrete emitters (i.e., flow regulating channels) provided therein, as is known in the art and described, for example, in U.S. Pat. Nos. 5,111,996 and 4,824,025. In accordance with the invention, the emitters can have varying geometries, for example, from five to fifteen different geometries, to provide for different drip rates. As the hard hose is extruded, the emitters having different geometries are inserted into the hose in a predetermined order so that the emitters are positioned in the hose to correspond to the field conditions in the field in which the hose is to be placed.

Preferably, regardless of the type of emitter used, the emitter characteristics or ratings are varied under computer control during manufacture to match the field location where the segment of hose in question is to be laid in the course of its installation. The field where the hose is to be laid is mapped so each area of the field is uniquely identified. The mapped areas of the field and the length of hose to be installed in the field are marked according to this identification. For example, one corner of the field could be marked as row 1, point a, . . . , to point n at the other end of the field; Next to row 1, is row 2, point a, . . . , to point n at the other end of the field, etc. to row n. Thus, a visible grid of rows and points is formed on the field to assist the field workers lay the hose so the positions of its emitters are congruent with the positions of the field where the emitters are supposed to be according to their discharge rates. The hose is marked by the computer in coordination with the control of the discharge rate. As a result, the field workers can proper lay the hose by matching the markings on the hose with the markings on the field.

The invention is not limited to fixed geometry emitters over the length of the hose, but also allows for varying geometry (pressure-compensating) emitters with different target flows positioned along the run. A combination of these concepts is useful, for example, where the geometry of the emitters is altered to account for changes in soil conditions and the emitters are also pressure-compensating to account for changes in pressure along the length of the hose.

The inventive hoses have numerous applications. The invention permits customer-unique irrigation products using specific flow rate emitters with different flow rates positioned specifically over the length of a customer's run as a means of accommodating changes in elevation or as a means of accommodating changes in supply pressure over the specific length of the run. For example, the hose can be designed to gradually increase the output towards the end of the run to compensate for pressure decreases along the run. This will allow the length of run to be extended while maintaining the distribution uniformity.

Additionally, customized hose can be made to have different sections with different flows to account for variations in soil conditions or crop requirements. Sandy soil may require higher flow than would clay soil. With the farmer being able to plot GPS maps of their field and identify different soil characteristics, a custom tape can be made to match the different flow requirements of that field. In addition to varying emitter flow rates, variations in emitter spacing may be employed as a means of accounting for customer unique requirements. For example, a denser population of lower flow emitters may be provided if advantageous for specific soil conditions.

Moreover, non-customer specific irrigation products could be designed that use fixed geometry emitters of varying flow rate capabilities specifically positioned over the length of a run as a means of accommodating changes in pressure along a level or slightly sloping run.

In accordance with the invention, specific emitter characteristics are provided on the hoses to assist the farmer with installation. Generally the hose is provided to the farmer in rolls. Information is put on the rolls in such a way as to account for specific customer installation patterns. For example, the information would recite "lay down four parallel rows driving away from the water header, skip four rows, and drive back towards the water header." Other installation could information could be provided as desired.

In another aspect of the invention, a system is provided that stores customer field information, such as topography, soil conditions, and drainage requirements, for purposes of providing customer specific irrigation products on a periodic basis. Additionally, the system can automatically update customer specific irrigation products in response to crop yield information (provided by satellite sensing, airborne sensing, or other means), or in response to changes in crops planted.

The invention is also directed to a manufacturing process that allows sales managers, dealers, customers or other personnel to use software to convert field characteristic data into specific irrigation layout designs, which are fed electronically to the hose manufacturing equipment, and customer specific product is automatically produced. Field characteristic data includes, but is not limited to, soil conditions, target flow rates, installation patterns, topography, and crops planted.

In another aspect, the invention is direct to a method for improving discharge rate uniformity by controlling the flow rate of the header pipe, to which the individual irrigation hoses are connected. In one embodiment, the header pipe is designed to selectively deploy different flow rates to the individual hoses that extend throughout the field. Selective deployment of different flow rates is accomplished by varying the geometry, e.g., the cross-sectional area, of the header pipe.

The above-described embodiments of the invention are only considered to be preferred and illustrative of the inventive concepts. The scope of the invention is not to be restricted to such embodiments. Various and numerous other arrangements may be devised by one skilled in the art without departing from the spirit and scope of the invention.

What is claimed is:

1. A drip irrigation hose having a water supply passage and a plurality of flow regulating channels manufactured into the hose that are smaller than the water supply passage, the flow regulating channels each comprising:
    a predesignated geometry to provide a desired discharge rate at a given pressure,
    an inlet section comprising one or more openings connecting the water supply passage to that flow regulating channel, and
    an outlet section comprising one or more openings connecting that flow regulating channel to the exterior of the hose,
wherein the plurality of flow regulating channels have at least two different geometries to provide at least two different discharge rates at the given pressure.

2. A hose according to claim 1, wherein the plurality of flow regulating channels have at least two different heights to provide at least two different discharge rates at the given pressure.

3. A hose according to claim 1, wherein the plurality of flow regulating channels have at least two different widths to provide at least two different discharge rates at the given pressure.

4. A hose according to claim 1, having a first end for connection to a water supply source and a second end,
    wherein the flow regulating channels nearer the first end of the hose have geometries different from the geometries of the flow regulating channels nearer the second end of the hose so that, at a given pressure, the flow regulating channels nearer the second end have a greater discharge rate than the flow regulating channels nearer the first end of the hose, and so that, when the first end of the hose is connected to the water supply source, the discharge rates of the flow regulating channels are generally uniform over the length of the hose.

5. A hose according to claim 1, wherein each flow regulating channel has a fixed geometry.

6. A hose according to claim 1, wherein each flow regulating channel has a varying geometry.

7. A hose according to claim 1, wherein the flow regulating channels each further comprise a turbulent flow section.

8. A hose according to claim 1, wherein the plurality of flow regulating channels have turbulent flow sections having at least two different lengths to provide at least two different discharge rates at the given pressure.

9. A method for providing generally uniform irrigation in a field comprising:
    manufacturing a hose having first and second ends, a water supply passage and a plurality of flow regulating channels that are smaller than the water supply passage, the flow regulating channels each comprising:
        a predesignated geometry to provide a desired discharge rate at a given pressure,
        an inlet section comprising one or more openings connecting the water supply passage to that flow regulating channel, and
        an outlet section comprising one or more openings connecting the flow regulating channel to the exterior of the hose,
    wherein the flow regulating channels nearer the first end of the hose have geometries different from the geometries of the flow regulating channels nearer the second end of the hose so that, at a given pressure, the flow regulating channels nearer the second end have a greater discharge rate than the flow regulating channels nearer the first end of the hose;

placing the hose in the field with the first end of the hose connected to a water supply source; and introducing water through the hose, whereby the discharge rates of the flow regulating channels are generally uniform over the length of the hose.

10. A method according to claim 9, wherein the flow regulating channels each further comprise a turbulent flow section.

11. A method for providing generally uniform irrigation in a field having different elevations, the method comprising:

mapping the topography of the field;

manufacturing a hose having first and second ends, a water supply passage and a plurality of flow regulating channels that are smaller than the water supply passage, the flow regulating channels each comprising:

a predesignated geometry to provide a desired discharge rate at a given pressure, an inlet section comprising one or more openings connecting the water supply passage to that flow regulating channel, and an outlet section comprising one or more openings connecting that flow regulating channel to the exterior of the hose, wherein the plurality of flow regulating channels have at least two different geometries to provide at least two different discharge rates at the given pressure;

placing the hose in the field so that the flow regulating channels the produce higher discharge rates are positioned at higher elevations than the flow regulating channels that produce lower discharge rates; and introducing water through the hose, whereby the discharge rates of the flow regulating channels are generally uniform over the length of the hose.

12. A method according to claim 10, wherein the flow regulating channels each further comprise a turbulent flow section.

13. A method for irrigating a field having different soil conditions, the method comprising:

manufacturing a hose having first and second ends, a water supply passage and a plurality of flow regulating channels that are smaller than the water supply passage, the flow regulating channels each comprising:

a predesignated geometry to provide a desired discharge rate at a given pressure, an inlet section comprising one or more openings connecting the water supply passage to that flow regulating channel, and an outlet section comprising one or more openings connecting that flow regulating channel to the exterior of the hose, wherein the plurality of flow regulating channels have at least two different geometries to provide at least two different discharge rates at the given pressure;

placing the hose in the field so that the flow regulating channels having higher discharge rates are positioned near soil conditions where a higher discharge rate is desired and flow regulating channels having lower discharge rates are positioned near soil conditions where a lower discharge rate is desired; and introducing water through the hose.

14. A method according to claim 11, wherein the flow regulating channels each further comprise a turbulent flow section.

15. A method for manufacturing a drip irrigation hose having a water supply passage and a plurality of flow regulating channels having a cross-sectional area smaller than that of the water supply passage, the improvement comprising varying the geometries of the flow regulating channels so that the plurality of flow regulating channels have at least two different geometries to provide at least two different discharge rates at a given pressure.

16. The method of claim 15, comprising varying the heights of the flow regulating channels.

17. The method of claim 15, comprising varying the widths of the flow regulating channels.

18. The method of claim 15, wherein the flow regulating channel comprises a turbulent flow section.

19. The method of claim 15, comprising varying the length of the turbulent flow section.

20. The method of claim 15, wherein the hose is formed from a film having first and second margins that overlap each other, and further wherein the flow regulating channel is formed between the margins of the film.

21. The method of claim 20, comprising varying the height of the flow regulating channel.

22. A drip irrigation hose having a water supply passage and a plurality of flow regulating channels manufactured into the hose that are smaller than the water supply passage, the flow regulating channels each comprising:

a predesignated geometry to provide a desired discharge rate at a given pressure;

a turbulent flow section;

an inlet section comprising one or more openings connecting the water supply passage to that flow regulating channel; and an outlet section comprising one or more openings connecting that flow regulating channel to the exterior of the hose, wherein the plurality of flow regulating channels have at least two different geometries to provide at least two different discharge rates at the given pressure.

23. A hose according to claim 22, wherein the plurality of flow regulating channels have at least two different heights to provide at least two different discharge rates at the given pressure.

24. A hose according to claim 22, wherein the plurality of flow regulating channels have at least two different widths to provide at least two different discharge rates at the given pressure.

25. A hose according to claim 22, having a first end for connection to a water supply source and a second end, wherein the flow regulating channels nearer the first end of the hose have geometries different from the geometries of the flow regulating channels nearer the second end of the hose so that, at a given pressure, the flow regulating channels nearer the second end have a greater discharge rate than the flow regulating channels nearer the first end of the hose, and so that, when the first end of the hose is connected to the water supply source, the discharge rates of the flow regulating channels are generally uniform over the length of the hose.

26. A hose according to claim 22, wherein each flow regulating channel has a fixed geometry.

27. A hose according to claim 22, wherein each flow regulating channel has a varying geometry.

28. A hose according to claim 22, wherein the plurality of flow regulating channels have turbulent flow sections having at least two different lengths to provide at least two different discharge rates at the given pressure.

29. A drip irrigation hose having a water supply passage and a plurality of flow regulating channels manufactured into the hose that are smaller than the water supply passage, the flow regulating channels each comprising:
- a predesignated geometry to provide a desired discharge rate at a given pressure,
- an inlet section comprising one or more openings connecting the water supply passage to that flow regulating channel, and
- an outlet section comprising one or more openings connecting that flow regulating channel to the exterior of the hose,
- wherein the plurality of flow regulating channels have at least two different heights or at least two different widths to provide at least two different discharge rates at the given pressure.

30. A hose according to claim 29, having a first end for connection to a water supply source and a second end, wherein the flow regulating channels nearer the first end of the hose have heights or widths different from the heights or widths of the flow regulating channels nearer the second end of the hose so that, at a given pressure, the flow regulating channels nearer the second end have a greater discharge rate than the flow regulating channels nearer the first end of the hose, and so that, when the first end of the hose is connected to the water supply source, the discharge rates of the flow regulating channels are generally uniform over the length of the hose.

31. A hose according to claim 29, wherein the flow regulating channels each further comprises a turbulent flow section.

32. A method for providing generally uniform irrigation in a field comprising:
- manufacturing a hose having first and second ends, a water supply passage and a plurality of flow regulating channels that are smaller than the water supply passage, the flow regulating channels each comprising:
  - a predesignated geometry to provide a desired discharge rate at a given pressure,
  - an inlet section comprising one or more openings connecting the water supply passage to that flow regulating channel, and
  - an outlet section comprising one or more openings connecting the flow regulating channel to the exterior of the hose,
  - wherein the flow regulating channels nearer the first end of the hose have heights or widths different from the heights or widths of the flow regulating channels nearer the second end of the hose so that, at a given pressure, the flow regulating channels nearer the second end have a greater discharge rate than the flow regulating channels nearer the first end of the hose;
- placing the hose in the field with the first end of the hose connected to a water supply source; and
- introducing water through the hose, whereby the discharge rates of the flow regulating channels are generally uniform over the length of the hose.

33. A method for providing generally uniform irrigation in a field having different elevations, the method comprising:
- mapping the topography of the field;
- manufacturing a hose having first and second ends, a water supply passage and a plurality of flow regulating channels that are smaller than the water supply passage, the flow regulating channels each comprising:
  - a predesignated geometry to provide a desired discharge rate at a given pressure,
  - an inlet section comprising one or more openings connecting the water supply passage to that flow regulating channel, and
  - an outlet section comprising one or more openings connecting that flow regulating channel to the exterior of the hose,
  - wherein the plurality of flow regulating channels have at least two different heights or widths to provide at least two different discharge rates at the given pressure;
- placing the hose in the field so that the flow regulating channels the produce higher discharge rates are positioned at higher elevations than the flow regulating channels that produce lower discharge rates; and
- introducing water through the hose, whereby the discharge rates of the flow regulating channels are generally uniform over the length of the hose.

34. A method for irrigating a field having different soil conditions, the method comprising:
- manufacturing a hose having first and second ends, a water supply passage and a plurality of flow regulating channels that are smaller than the water supply passage, the flow regulating channels each comprising:
  - a predesignated geometry to provide a desired discharge rate at a given pressure,
  - an inlet section comprising one or more openings connecting the water supply passage to that flow regulating channel, and
  - an outlet section comprising one or more openings connecting that flow regulating channel to the exterior of the hose,
  - wherein the plurality of flow regulating channels have at least two different heights or widths to provide at least two different discharge rates at the given pressure;
- placing the hose in the field so that the flow regulating channels having higher discharge rates are positioned near soil conditions where a higher discharge rate is desired and flow regulating channels having lower discharge rates are positioned near soil conditions where a lower discharge rate is desired; and
- introducing water through the hose.

35. A method for manufacturing a drip irrigation hose having a water supply passage and a plurality of flow regulating channels having a cross-sectional area smaller than that of the water supply passage, the improvement comprising varying the heights or widths of the flow regulating channels so that the plurality of flow regulating channels have at least two different geometries to provide at least two different discharge rates at a given pressure.

36. A method for manufacturing a drip irrigation hose having a water supply passage and a plurality of flow regulating channels having a cross-sectional area smaller than that of the water supply passage and further having a turbulent flow section, the improvement comprising varying the geometries of the flow regulating channels so that the plurality of flow regulating channels have at least two different geometries to provide at least two different discharge rates at a given pressure.

37. The method of claim 36, comprising varying the heights of the flow regulating channels.

38. The method of claim 36, comprising varying the widths of the flow regulating channels.

39. The method of claim 36, comprising varying the length of the turbulent flow section.

40. The method of claim 36, wherein the hose is formed from a film having first and second margins that overlap each other, and further wherein the flow regulating channel is formed between the margins of the film.

41. The method of claim 40, comprising varying the height of the flow regulating channel.

* * * * *

UNITED STATES PATENT AND TRADEMARK OFFICE
CERTIFICATE OF CORRECTION

PATENT NO.    : 6,308,902 B1                                      Page 1 of 1
DATED         : October 30, 2001
INVENTOR(S)   : Mark Huntley

It is certified that error appears in the above-identified patent and that said Letters Patent is hereby corrected as shown below:

Column 9,
Line 32, replace "the produce" with -- that produce --.

Column 12,
Line 6, replace "the produce" with -- that produce --.

Signed and Sealed this

Seventh Day of January, 2003

JAMES E. ROGAN
*Director of the United States Patent and Trademark Office*